United States Patent
Choi et al.

(10) Patent No.: US 11,094,425 B2
(45) Date of Patent: Aug. 17, 2021

(54) THERMIONIC POWER CELL

(71) Applicant: United States of America as represented by the Administrator of NASA, Washington, DC (US)

(72) Inventors: Sang H. Choi, Poquoson, VA (US); Adam J. Duzik, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 538 days.

(21) Appl. No.: 15/995,467

(22) Filed: Jun. 1, 2018

(65) Prior Publication Data
US 2018/0350481 A1 Dec. 6, 2018

Related U.S. Application Data

(60) Provisional application No. 62/513,497, filed on Jun. 1, 2017.

(51) Int. Cl.
*H02N 11/00* (2006.01)
*G21H 1/00* (2006.01)

(52) U.S. Cl.
CPC ............. *G21H 1/00* (2013.01); *H02N 11/002* (2013.01)

(58) Field of Classification Search
CPC .............................. G21H 11/00; H02N 11/002
USPC ........................................................ 310/304
See application file for complete search history.

(56) References Cited

U.S. PATENT DOCUMENTS

| | | | | | |
|---|---|---|---|---|---|
| 2,724,216 | A | * | 11/1955 | Cisne ...................... | H01J 19/42 65/56 |
| 3,201,618 | A | * | 8/1965 | Coleman ................. | H01J 45/00 310/306 |
| 3,558,935 | A | * | 1/1971 | Gritton et al. ........... | G21C 1/22 376/321 |

(Continued)

OTHER PUBLICATIONS

David B. Go et al., "Thermionic Energy Conversion in the Twenty-first Century: Advances and Opportunities for Space and Terrestial Applications," Frontiers in Mechanical Engineering, 3(13):1-17 (Nov. 8, 2017).

(Continued)

*Primary Examiner* — Terrance L Kenerly
(74) *Attorney, Agent, or Firm* — Shawn P. Gorman; Jennifer L. Riley; Helen M. Galus

(57) ABSTRACT

A thermionic (TI) power cell includes a heat source, such as a layer of radioactive material that generates heat due to radioactive decay, a layer of electron emitting material disposed on the layer of radioactive material, and a layer of electron collecting material. The layer of electron emitting material is physically separated from the layer of electron collecting material to define a chamber between the layer of electron collecting material and the layer of electron emitting material. The chamber is substantially evacuated to permit electrons to traverse the chamber from the layer of electron emitting material to the layer of electron collecting material. Heat generated over time by the layer of radioactive material causes a substantially constant flow of electrons to be emitted by the layer of electron emitting material to induce an electric current to flow through the layer of electron collecting material when connected to an electrical load.

19 Claims, 4 Drawing Sheets

(56) References Cited

U.S. PATENT DOCUMENTS

2007/0126312 A1* 6/2007 Sung ................. H01J 3/021
                                                                            310/306
2013/0084474 A1* 4/2013 Mills ................. H01M 10/399
                                                                             429/9

OTHER PUBLICATIONS

K. Khalid et al., "Review on Thermionic Energy Converters," IEEE Transactions on Electron Devices, 63(6):2231-2241 (Jun. 6, 2016).
"Atomic Batteries for Deep Space Missions," NASA, Jet Propulsion Laboratory, U.S. Dept. of Energy. 1 sheet.
M. I. Shahzad et al., "Growth of vertically aligned multiwall carbon nanotubes columns," 6th Vacuum and Surface Sciences Conference of Asia and Australia (VASSCAA-6) Oct. 9-13, 2012 Islamabad, Pakistan; J. Phys.: Conf. Ser. 439:012008 (2013).
"Thermionic converter," Wikipedia, 4 pgs., https://en.wikipeia.org/wiki/Thermionic_converter, downloaded on May 14, 2018.
"Thermionic emission," Wikipedia, 8 pgs., https://en.wikipedia.org/wiki/Thermionic_emission, downloaded on May 14, 2018.
"Thermoelectric materials," Wikipedia, 17 pgs., https://en.wikipedia.org/wiki/Thermoelectric_materials, downloaded on May 14, 2018.
"Radioisotope thermoelectric generator," Wikipedia, 4 pgs., https://en.wikipedia.org/wiki/Radioisotope_thermoelectric_generator, downloaded on May 14, 2018.

* cited by examiner

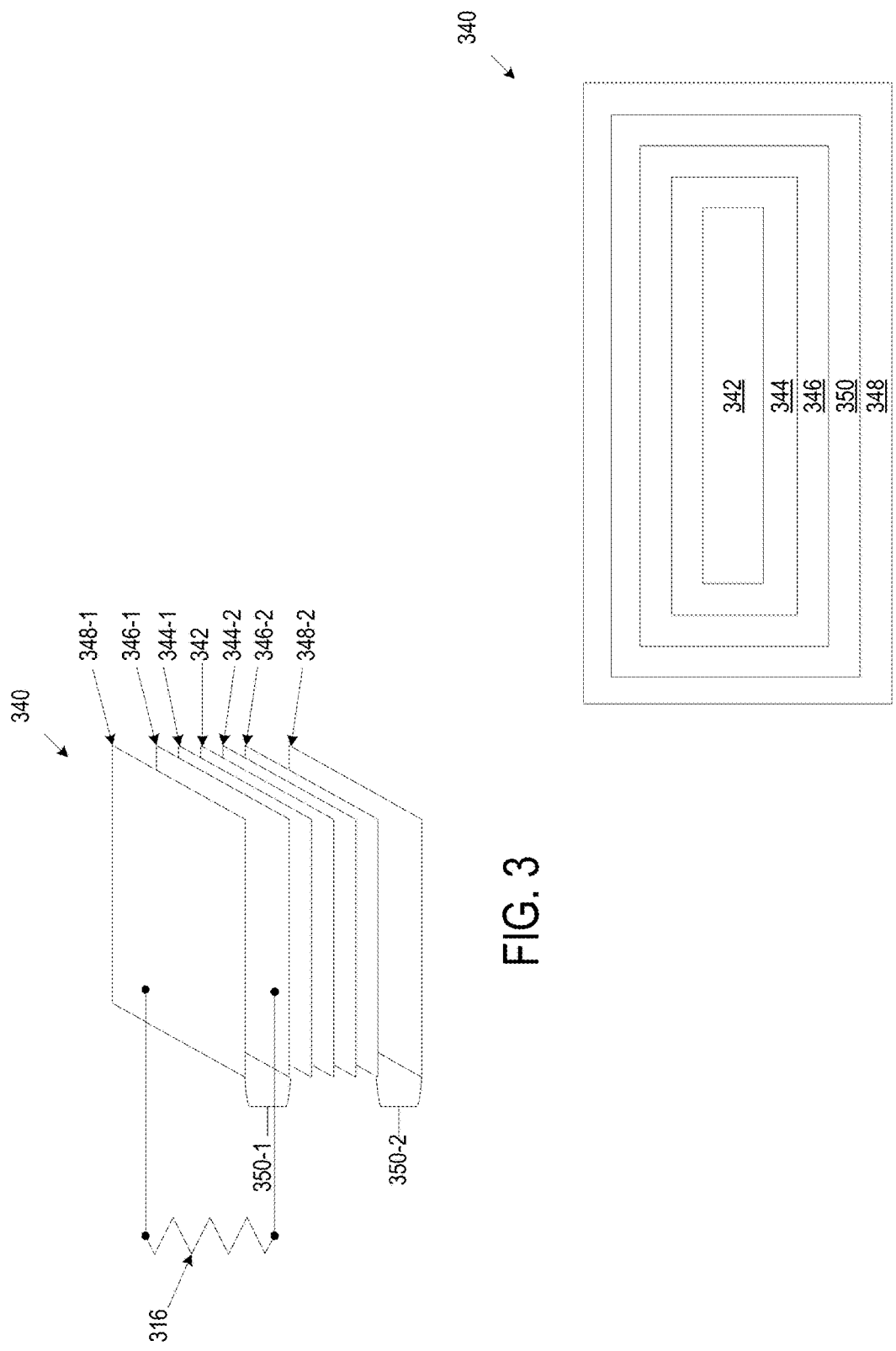

THERMIONIC POWER CELL

CROSS-REFERENCE TO RELATED PATENT APPLICATION(S)

This patent application claims the benefit of priority to U.S. Provisional Application No. 62/513,497, filed on Jun. 1, 2017, the contents of which are hereby incorporated by reference in their entirety for any purpose whatsoever.

STATEMENT REGARDING FEDERALLY SPONSORED RESEARCH OR DEVELOPMENT

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

Portable electronic devices require a power supply to function. The power supply may be internal to a device, such as a battery including electrochemical cells, or external to the tool, such as a battery pack coupled to the device. Radioisotope thermoelectric generators (RTGs) may be used as a power supply for large devices, such as deep space probes. RTGs are large, bulky, heavy, and costly and do not generate significant power, rendering RTGs unsuitable power supplies for smaller and/or portable electronic devices.

BRIEF SUMMARY

A thermionic (TI) power cell includes a layer of radioactive material that generates heat due to radioactive decay, a layer of electron emitting material disposed on the layer of radioactive material, and a layer of electron collecting material. The layer of electron emitting material is physically separated from the layer of electron collecting material to define a chamber between the layer of electron collecting material and the layer of electron emitting material. The chamber is substantially evacuated, or evaluated as much as reasonably practicable, to permit electrons to traverse the chamber from the layer of electron emitting material to the layer of electron collecting material. Heat generated over time by the layer of radioactive material causes a substantially constant flow of electrons to be emitted by the layer of electron emitting material to induce an electric current to flow through the layer of electron collecting material when the layer of electron collecting material is connected to an electrical load.

A method for generating an electric current includes heating a layer of electron emitting material disposed on a layer of radioactive material by radioactive decay of the layer of radioactive material. The method includes emitting electrons from the layer of electron emitting material to a layer of electron collecting material by thermionic emission. The layer of electron emitting material is physically separated from the layer of electron collecting material to define a chamber between the layer of electron collecting material and the layer of electron emitting material. The chamber is substantially evacuated to permit electrons to traverse the chamber from the layer of electron emitting material to the layer of electron collecting material. The method includes inducing an electric current to flow through the layer of electron collecting material connected to an electrical load. Heat generated over time by the layer of radioactive material causes a substantially constant flow of electrons to be emitted by the layer of electron emitting material.

The disclosure further provides implementations of a thermionic (TI) power cell that includes a heat source, a heat conductive layer that provides heat from the heat source, a layer of electron emitting material disposed on the heat conductive layer, and a layer of electron collecting material. The layer of electron emitting material is physically separated from the layer of electron collecting material to define a chamber between the layer of electron collecting material and the layer of electron emitting material. The chamber is substantially evacuated to permit electrons to traverse the chamber from the layer of electron emitting material to the layer of electron collecting material. Heat generated over time by the heat source causes a substantially constant flow of electrons to be emitted by the layer of electron emitting material to induce an electric current to flow through the layer of electron collecting material when the layer of electron collecting material is connected to an electrical load. The heat source can include any suitable heat source, such as an exhaust manifold and the like.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 3 is an open view of an exemplary TI power cell;

FIG. 4 is a cross-sectional view of the exemplary TI power cell of FIG. 3;

DETAILED DESCRIPTION

For purposes of description herein, the terms "upper," "lower," "right," "left," "rear," "front," "vertical," "horizontal," and derivatives thereof shall relate to the structure as oriented in FIG. 3. However, it is to be understood that the embodiments may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
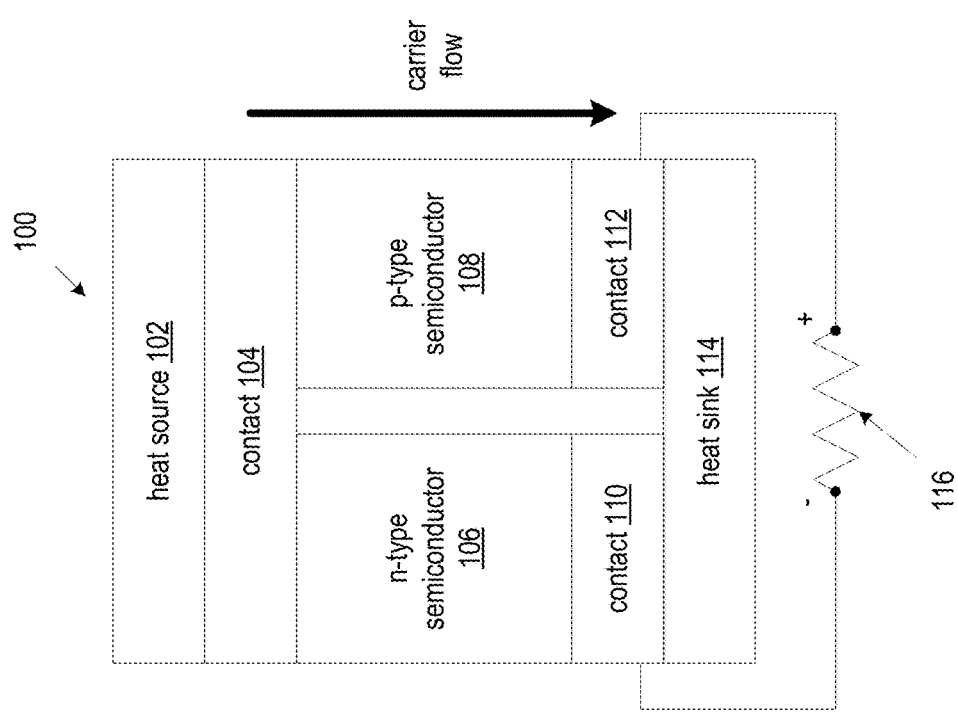
FIG. 1 is a block diagram illustration of an exemplary thermoelectric generator (TEG)

FIG. 1 is a block diagram schematic of an illustrative thermoelectric generator (TEG) 100 as known in the prior art. The illustrated TEG is a solid state device that converts heat flux directly into electrical energy. The TEG 100 includes a heat source 102. In a RTG, which is a type of TEG, the heat source 102 is a heat-generating radioactive material, such as plutonium-238 (Pu-238). The heat source 102 is coupled to an n-type semiconductor material 106 and a p-type semiconductor material 108 via contact 104. A heat sink 114 is coupled to the n-type semiconductor material 106 via contact 110 and the p-type semiconductor material 108 via contact 112. The heat generated by the heat source 102 drives electrons and hole carriers in the n-type and p-type semiconductor materials 106 and 108, respectively, toward the heat sink 114, which results in a continuous current flow. An electrical load 116 can be coupled to the contacts 110 and 112 to supply an electric current flow to the electrical load 116. However, the amount of current generated by TEGs is limited by multiple factors.

Carrier concentrations of semiconductor materials used in TEGs are less than carrier concentrations of metals (about two to three orders of magnitude less) that are used in other types of power supplies. Moreover, the figure of merit (FoM) of the TEG 100 is limited. A high FoM requires high electrical conductivity and low thermal conductivity but this is a severe obstacle. The motion of electrons is measured as an electrical current and the kinetic energy of electrons is regarded as thermal energy at the same time. Although electrical and thermal conductivities are regarded as intrinsic properties of material, they are defined from Boltzmann statistical means. Moreover, because the FoM is inversely related to the thermal conductivity, an "ideal" TEG would have a thermal conductivity of zero. But if the thermal conductivity was zero, then no heat would flow in the TEG and, therefore, no thermal power could be converted to electrical power. To overcome these limitations, the size of the TEG 100 may be increased. For example, increasing the size of the n-type and p-type semiconductor materials 106 and 108 increases the number of carriers that can be driven by the heat source 102. However, the size of the heat source 102 must also be increased to generate sufficient heat to the larger n-type and p-type semiconductor materials 106 and 108. Consequently, TEGs are large, bulky, heavy, and costly, and not suitable power supplies for small electronic devices. RTGs require kilograms of radioactive material, which is difficult and expensive to produce in large quantities. Even though the output current generated by an RTG can be improved by increasing the size of the RTG, the current density still suffers from the limitations of TEGs described above. Furthermore, increasing the size of the RTG may not be a viable option because as the size of devices decrease, such as the size of space probes, the large sizes and weights of RTGs increase launch costs significantly for low earth orbit and even more for higher orbits. In contrast, the output current density of a TEG does not vary with a change in the size of the TEG. Therefore, the size of a TEG is scalable without affecting the output current density.

Figure 2:
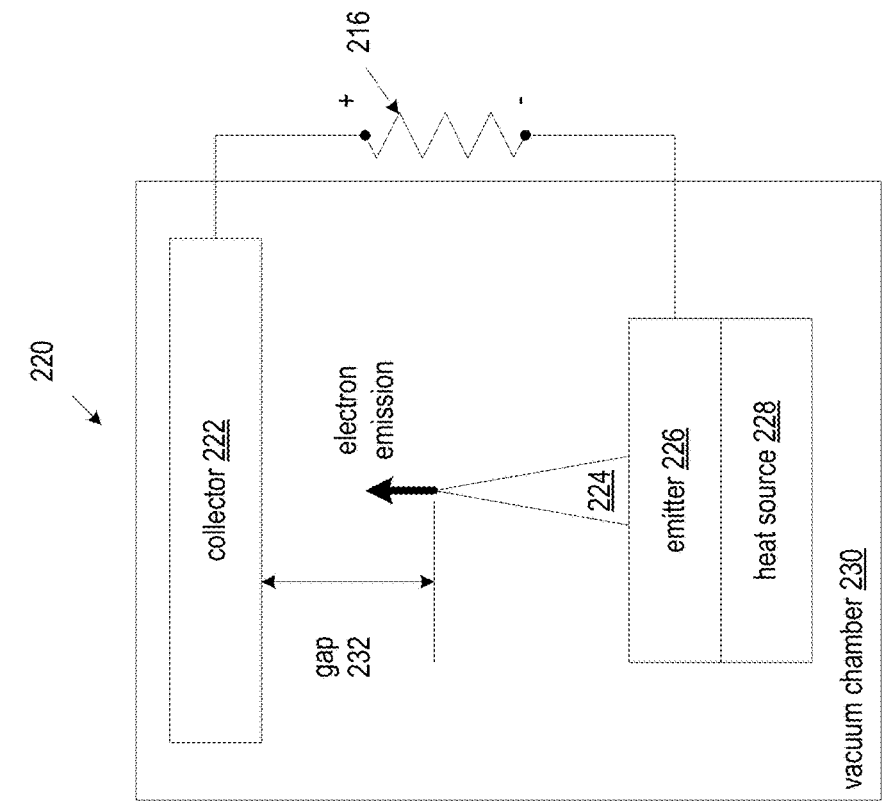
FIG. 2 is a block diagram illustration of an exemplary thermionic generator (TIG)

FIG. 2 is a block diagram illustration of an exemplary thermionic generator (TIG) 220 in accordance with one or more embodiments of the present disclosure. In contrast to the prior art TEG 100 shown in FIG. 1, the TIG 220 uses thermionic emission to generate an electrical current. Thermionic emission is the thermally induced flow of charge carriers (e.g., electrons, ions) from a surface. Thermionic emission occurs when the thermal energy (heat) given to a charge carrier overcomes the work function of the material so that the charge carrier is emitted from the material. As used herein, "work function" refers to the minimum thermodynamic work (i.e., the amount of energy) necessary to remove a charge carrier from a solid material to a point in a vacuum immediately outside the surface of the solid material.

The TIG 220 includes a heat source 228 coupled to an electron emitter 226. The heat source 228 provides heat to the electron emitter 226 to generate an electric potential in the electron emitter 226. As shown in FIG. 2, the electron emitter 226 can include a spike 224 to focus the electric potential generated in the electron emitter 226 at the tip of the spike 224. Focusing the electric potential aids in energizing electrons of the electron emitter 226 so that the electrons escape the electron emitter 226 entirely, via the spike 224, and into the vacuum chamber 230. The TIG 220 includes an electron collector 222 to collect the electrons emitted from the electron emitter 226. An electrical load 216 can be coupled to the electron collector 222 and the electron emitter 226 to supply an electric current flow to the electrical load 216.

The current density generated by thermionic emission is quantified by the Richardson-Dushman equation. Heating the electron emitter 226 to approximately 800 to 1000 degrees Celsius (° C.) generates a measureable current density by thermionic emission. Shortening the gap 232 between the electron emitter 226 and the electron collector 222, or the gap 232 between the tip of the spike 224 and the electron collector 222 as shown in FIG. 2, increases the electric current flow generated by the TIG 220. The distance of the gap 232 can range between approximately 100 micrometers (μm) to 1 millimeter (mm).

In contrast to the TEG 100 that requires semiconductor materials to operate, the illustrated TIG 220 uses conductive materials with low work functions for the electron emitter 226 and the electron collector 222. A material that has a low work function and a high availability of electrons for emission provides effective electron emission. Non-limiting examples of such electron emitting materials include metals such as copper (Cu) The electron emitter 226 can include a semiconductor material; however, semiconductor materials have lower electron densities than other electron emitting materials (e.g., metals). Thus, a large quantity of a semiconductor material is necessary to have sufficient electrons available to generate an electric current capable of powering an electric device. Further suitable emitter materials are described below.

The TIG 220 includes fewer components than the TEG 100. While the current flow generated by the TEG 100 increases with an increase in the size of the components of the TEG 100, the current flow generated by the TIG 220 increases with an increase in the sharpness of the emitter spikes (e.g., 224) and the topological arrangement of the spikes (e.g., number of spikes per area (spike density)) on the surface of the electron emitter 226 of the TIG 220 (e.g., a smaller vacuum gap 232).

Changing the distance of the gap 232 between the spike 224 and the electron collector 222 has a significant impact of the current flow generated by the TIG 220. If the gap 232 is too small, then the electrical field distribution breaks down so that electrons flow from the electron collector 222 to the electron emitter 226 via the spike 224, which can cause wear and damage to the electron collector 222, the spike 224, and/or the electron emitter 226 over time. If the gap 232 is too large, then stationary electrons, also referred to as a dark current, form on the surface of the electron emitter 226. Optimizing the distance of the gap 232 and/or the size of the spikes (e.g., 224) without reducing the number of electrons available for thermionic emission is preferable. The spikes can be uniform in size and shape to maintain a uniform gap 232. Thermionic emission increases dramatically as the distance of the gap 232 decreases. But, as explained above, there may be a risk of dielectric breakdown so that arcs of electrons travel from the electron collector 222 to the spike 224. If the gap 232 was small enough to cause quantum tunneling, then power generation capability of the TIG 220 increases even more because quantum tunneling permits far more electrons to reach the electron collector 222. However, the electron emitter 226, spike 224, and electron collector 222 would have to comprise the same material so that the electrons maintain the same energy after quantum tunneling.

The disclosed thermionic (TI) power cells in accordance with one or more embodiments provide approaches for a scalable, portable power supply. Such TI power cells can be used in multiple applications including, but not limited to, space exploration and terrestrial uses (e.g., robots, rovers, beacons, remote sensors, and/or drones). The disclosed TI power cells can serve as a power supply for micro-satellites, thereby making micro-satellites more feasible for deep space exploration that would otherwise be too costly with a full-size probe.

As explained above, TIGs are simpler and more efficient than TEGs. The efficiency of a TIG can be expected to be approximately 10-20% whereas the efficiency of a TEG can be expected to be approximately 7%. The disclosed TI power cells can be manufactured using semiconductor manufacturing techniques. Thus, the manufacturing costs associated with the TI power cells are less than the manufacturing costs associated with TEGs and RTGs. The disclosed TI power cell can supply power to multiple devices over a significant amount of time by removing a TI power cell from one device and coupling the TI power cell to another device. For example, implementations including plutonium-238 (Pu-238) as a heat source have long use lives because the half-life of Pu-238 is 87.7 years. However, the heat source is not limited to Pu-238 and other radioactive isotopes can be used. Implementations of the present disclosure can use any source of heat, such as engine exhaust manifolds, that generates sufficient heat for thermionic emission to occur. Unlike batteries and other electrochemical cells, the disclosed TI power cells are not susceptible to chemical decay within a TI power cell itself over time. Whereas the active regions of solar cells are directly exposed to the harsh environment of space, but the disclosed TI power cells can be enclosed, for example, by an outer shell, to provide protection against high energy particles, such as galactic cosmic rays (GCRs). The disclosed TI power cells can continue to operate even if the enclosure is damaged. The disclosed TI power cells operate continuously, simplifying use of the TI power cells as compared to batteries. The TI power cells can be a drop-in replacement power supply for devices previously using batteries and/or solar cells as a power supply.

FIG. 3 is an open view of an exemplary TI power cell 340. The TI power cell 340 includes a layer of radioactive material 342. The layer of radioactive material 342 generates heat due to radioactive decay of the radioactive material. A non-limiting example of radioactive material is plutonium-238 (Pu-238). A layer of insulating material 344-1 is disposed on an upper surface of the layer of radioactive material 342 and a layer of insulating material 344-2 is disposed on a lower surface of the layer of radioactive material 342. At least one of the layers of insulating material 344-1 and 344-2 can be a thin-film insulator. The layers of insulating material 344-1 and 344-2 protect the electron emitting material and the electron collecting material of the TI power cell 340 from overheating and/or the radioactive material.

The TI power cell 340 includes a layer of electron emitting material 346-1 disposed on the layer of insulating material 344-1 and a layer of electron emitting material 346-2 disposed on the layer of insulating material 344-2. Non-limiting examples of electron emitting material include copper (Cu), silicon (Si), silicon germanium (SiGe), diamond, tungsten (W), lanthanum hexaboride (LaB6), carbon nanotubes (CNTs) and diamond. The layers of electron emitting material 346-1 and 346-2 have a low work function. Such layers of electron emitting material may be formed or supplemented with a high-density array of protrusions such as spikes, bumps, ridges, and the like.

The TI power cell 340 includes a layer of electron collecting material 348-1 above the layer of electron emitting material 346-1 and a layer of electron collecting material 348-2 below the layer of electron emitting material 346-2. A non-limiting example of electron collecting material is Cu. The layer of electron collecting material 348-1 is separated from the layer of electron emitting material 346-1 by an evacuated chamber, referred to herein as a vacuum gap 350-1 and the layer of electron collecting material 348-2 is separated from the layer of electron emitting material 346-2 by a similar vacuum gap 350-2.

The TI power cell 340 can include a first terminal coupled to the layer of electron emitting material 346-1 or 346-2 and a second terminal coupled to the layer of electron collecting material 348-1 or 348-2. An electrical load 316 can be coupled to the first and second terminals so that an electric current is induced to flow through the layer of electron collecting material 348-1 or 348-2 when connected to the electrical load 316.

FIG. 4 is a cross-sectional view of the exemplary TI power cell 340 of FIG. 3. The layer of radioactive material 342 can be a thin plate of radioactive material. In one implementation, the layer of radioactive material 342 includes up to five grams of Pu-238. Such small quantities of Pu-238 are readily producible, and can be reused for recycling if the TI power cell 340 is dismantled. The small quantity of radioactive material enables the size of the TI power cell 340 to be scalable. At least one implementation of the TI power cell 340 has dimension of 5 centimeters (cm) long, 3 cm, and 0.5 cm thick (approximately the size of a battery for a cellular phone) for use as a power supply of portable electric devices.

The layer of radioactive material 342 can be encapsulated by the insulating material so that the layers of insulating material 344-1 and 344-2 shown separately in FIG. 3 are part of the layer of insulating material 344 shown in FIG. 4. Similarly, the layers of electron emitting material 346-1 and 346-2 shown separately in FIG. 3 can be part of the layer of electron emitting material 346 shown in FIG. 4. The layer of electron emitting material 346 can encapsulate the layer of insulating material 344.

The layers of electron collecting material 348-1 and 348-2 shown separately in FIG. 3 can be part of the layer of electron collecting material 348 shown in FIG. 4. The layer of electron collecting material 348 is separated from the layer of electron emitting material 346 by the vacuum gap 350. The vacuum gaps 350-1 and 350-2 shown separately in FIG. 3 form a chamber that surrounds the layer of electron emitting material 346, the layer of insulating material 344, and the layer of radioactive material 342. Although not shown in FIG. 4, the TI power cell 340 can include vacuum insulation cladding that encompasses the layer of electron collecting material 348. Preferably, the vacuum insulation cladding can withstand a continuous temperature gradient of at least 500° C. per millimeter.

Figure 5:
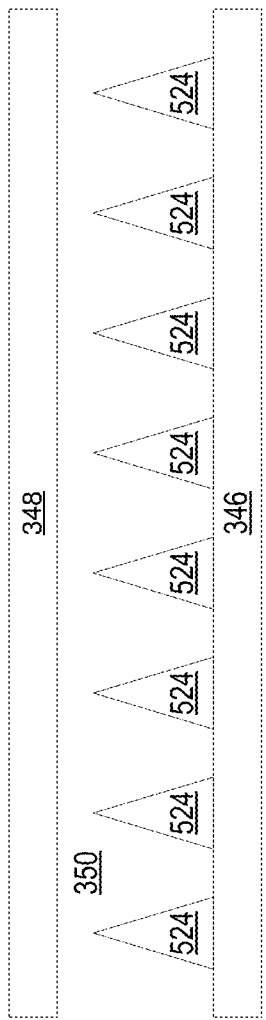
FIG. 5 is a cross-sectional view of an exemplary layer of electron emitting material including an array of spikes.

FIG. 5 is a cross-sectional view of an exemplary layer of electron emitting material 346 including an array of spikes 524. As explained above, the spikes 524 focus the electrical potential generated in the layer of electron emitting material 346 at the tip of the spikes 524 so that the electrons escape the spikes 524 entirely. In one implementation, each spike 524 can be on the order of 100s of micrometers (μm) tall. The spikes are tall enough so that the voltage concentration at the tips of the spikes 524 does not get absorbed into the layer of electron emitting material 346 on which the spikes 524 rest. The array of the spikes 524 emits thermalized electrons effectively because the strength of an electric field generated by a collected charge density at the tip of one or more of the spikes 524 is sufficient to repel electrons into the vacuum gap 350. The surface of the layer of electron emitting material 346 (e.g., upper and/or lower surfaces and/or sides) can be modified topologically to include an array of the spikes 524. For example, the array of the spikes 524 can be formed using semiconductor microfabrication technology. Fin field-effect transistor (FinFET) semiconductor processing can achieve device sizes of twenty nanometers or less, for example, with electron emitting materials including Cu, Si, and SiGe. Such semiconductor microfabrication technology can be used to manufacture the layer of electron emitting material 346. Because well-established semiconductor manufacturing techniques can be used, costs associated with manufacturing the TI power cell 340 are reduced.

Decreasing the size of the tips of the spikes 524, increases the voltage concentration at the tips. In at least one implementation, the spikes 524 are formed such that the tips of the spikes are spaced away from one another by approximately 100 μm. Decreasing the spacing between tips of the spikes 524 increases the electrical power generated by the TI power cell 340. However, if lateral spacing of the spikes 524 is less than the height of the spikes 524, then the electric fields from each spike will overlap, mimicking a flat surface and thereby decreasing the thermionic emission from the layer of electron emitting material 346 to the layer of electron collecting material 348, possibly causing electrons to jump from one of the spikes 524 to another. The lateral spacing can range between approximately 100 μm to 1 mm. The efficiency of the TI power cell 340 can be limited by the number of spikes 524 in an array formed on the layer of electron emitting material 346. Thus, increasing the number of the spikes 524 improves the utilization of heat generated by the layer of radioactive material 342, but increasing the number of the spikes 524 is limited by the height and lateral spacing of the spikes 524 as explained above.

Implementations of the disclosed TI power cells can include an array of emitters on the layer of electron emitting material 346 other than the array of spikes 524. The surface of the layer of electron emitting material 346 can include various geometric formations (e.g., protrusions) to focus the electric potential in the layer of electron emitting material 346. For example, the layer of electron emitting material 346 includes an array of one-dimensional (1-D) ridges.

Figure 6:
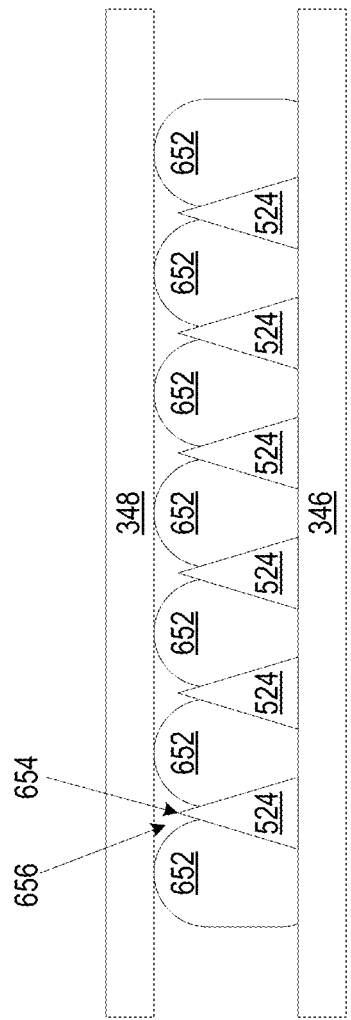
FIG. 6 is a cross-sectional view illustrating a layer of spacer material between a layer of electron emitting material and the layer of electron collecting material.

FIG. 6 is a cross-sectional view of an exemplary layer of spacer material 652 between a layer of electron emitting material 346 and the layer of electron collecting material 348. Non-limiting examples of spacer material include oxides and nitrides. The layer of spacer material 652 can be deposited on the layer of electron emitting material 346 including an array of the spikes 524. The layer of spacer material 652 advantageously reduces the size of the vacuum gap 656 surrounding the tips 654 of the spikes 524 so that the layer of electron collecting material 348 is positioned a few micrometers or less from the tips 654 of the spikes 524.

An exemplary method of depositing the layer of spacer material 652 as shown in FIG. 6 includes depositing spacer material on a layer of electron material 346 including an array of the spikes 524. The deposited spacer material is polished flat (e.g., by chemical mechanical polishing) so that thickness of the deposited spacer material above the tips 654 of the spikes 524 is a few micrometers. The spacer material above the tips 654 of the spikes 524 is selectively patterned and removed (e.g., chemically removed). The voids above the tips 654 of the spikes 524 are filled with a temporary spacer material that is removable with an etchant that does not affect the previously deposited spacer material. The layer of electron collecting material 348 is deposited on the deposited spacer material and the temporary spacer material. Vias (e.g., holes) are etched in the layer of electron collecting material 348 on or near the tips 654 of the spikes 524. The temporary spacer material is removed using an etchant inserted into the vias in the layer of electron collecting material 348. This exemplary method results in a few micrometer gap 656 between the tips 654 of the spikes 524 and the layer of electron collecting material 348. A vacuum can be applied to the vias in the layer of electron collecting material to evacuate the gaps 656.

Figure 7:
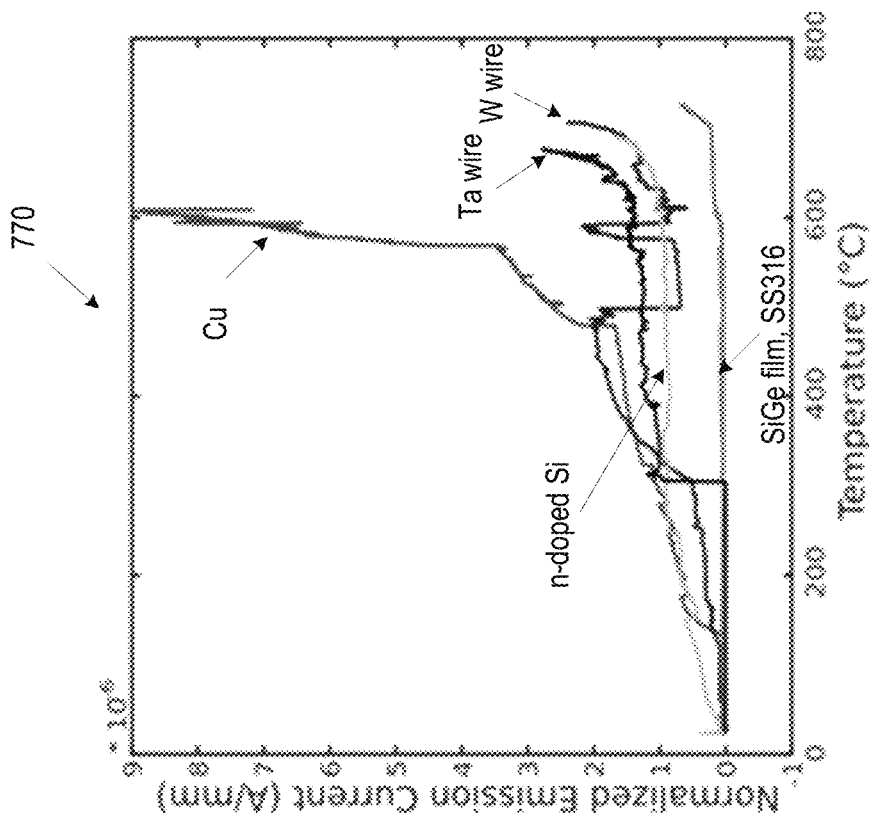
FIG. 7 is a graph of the emission current density vs temperature of various compositions of an exemplary layer of electron emitting material including an array of spikes.

FIG. 7 is a graph 770 of the emission current density vs temperature of various compositions of an exemplary layer of electron emitting material including an array of spikes. Samples of copper (Cu), stainless steel 316 (SS316), tungsten (W) wire, n-doped silicon (Si), silicon germanium (SiGe)/aluminum oxide ($Al_2O_3$) film, and tantalum wire were heated to approximately 700° C. The tips of the spikes were 1 mm away from the layer of electron collecting material. The emission current shown in the graph 770 is normalized by the emission area for comparison between samples of different sizes. The emission current was measured with a picoammeter. The sample of Cu showed the best performance at approximately 1E-5 amperes per millimeter (A/mm).

Figure 8:
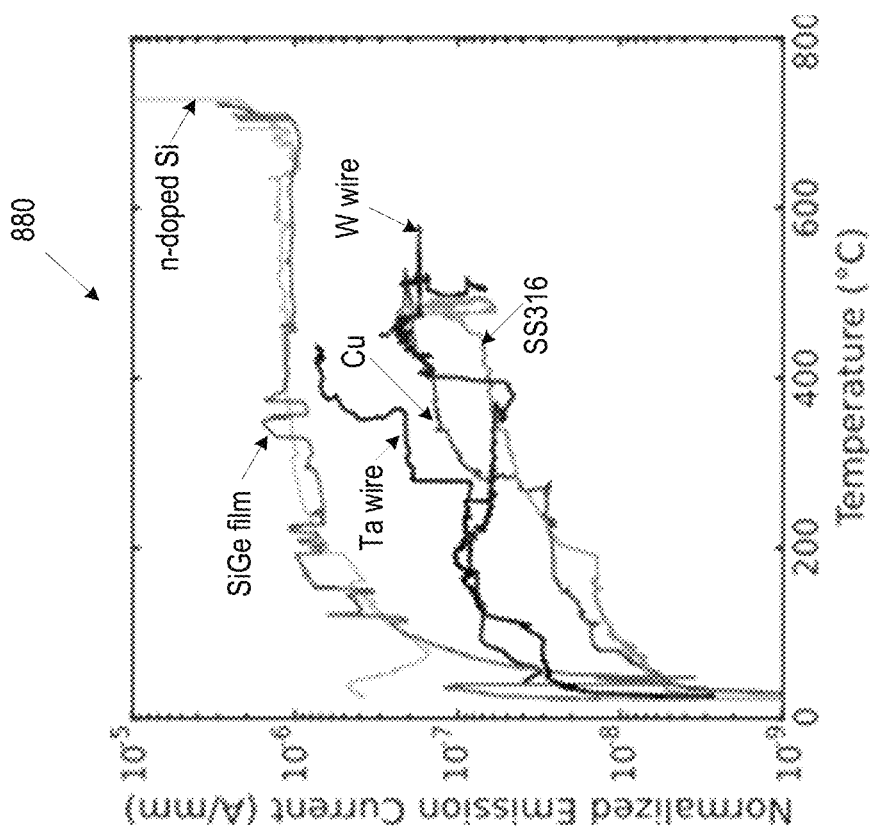
FIG. 8 is a graph of the emission current density vs temperature of various compositions of an exemplary flat layer of electron emitting material.

FIG. 8 is a graph 880 of the emission current density vs temperature of various compositions of an exemplary flat layer of electron emitting material. Samples of copper (Cu), stainless steel 316 (SS316), tungsten (W) wire, n-doped silicon (Si), silicon germanium (SiGe)/aluminum oxide ($Al_2O_3$) film, and tantalum wire were heated to approximately 700° C. The layer of electron emitting material was 3 mm away from the layer of electron collecting material. The emission current shown in the graph 880 is normalized by the emission area for comparison between samples of different sizes. The sample of n-doped Si and SiGe/$Al_2O_3$ films showed the highest current density at 3E-5 A/mm.

Though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:

1. A thermionic (TI) power cell, comprising:
a layer of radioactive material that generates heat due to radioactive decay;
a layer of electron emitting material disposed on the layer of radioactive material; and
a layer of electron collecting material, wherein the layer of electron emitting material is physically separated from the layer of electron collecting material to define a chamber between the layer of electron collecting material and the layer of electron emitting material, wherein the chamber is substantially evacuated to permit electrons to traverse the chamber from the layer of electron emitting material to the layer of electron collecting material, and further wherein heat generated over time by the layer of radioactive material causes a substantially constant flow of electrons to be emitted by the layer of electron emitting material to induce an electric current to flow through the layer of electron collecting material when the layer of electron collecting material is connected to an electrical load.

2. The TI power cell of claim 1, wherein the layer of electron emitting material includes an array of spikes to concentrate the electrons emitted by the layer of electron emitting material at tips of the spikes, wherein the tips of the spikes point toward the layer of electron collecting material.

3. The TI power cell of claim 2, wherein the tips of the spikes are separated from one another by a lateral spacing of approximately 100 micrometers to approximately 1 millimeter.

4. The TI power cell of claim 2, wherein the chamber is defined by a gap of approximately 100 micrometers to approximately 1 millimeter between the tips of the spikes and the layer of electron collecting material.

5. The TI power cell of claim 2, further comprising a layer of spacer material disposed between the layer of electron emitting material and the layer of electron collecting material,
wherein the layer of spacer material exposes the tips of the spikes so that the exposed tips are disposed in the chamber.

6. The TI power cell of claim 1, further comprising:
a first terminal coupled to the layer of electron emitting material; and
a second terminal coupled to the layer of electron collecting material to induce the electric current from the first terminal to the electrical load and from the electrical load to the second terminal.

7. The TI power cell of claim 1, further comprising a layer of insulating material disposed between the layer of radioactive material and the layer of electron emitting material.

8. The TI power cell of claim 1, wherein:
the layer of electron emitting material encapsulates the layer of radioactive material; and
the layer of electron collecting material surrounds the layer of electron emitting material.

9. The TI power cell of claim 1, wherein the layer of radioactive material includes a thin plate of plutonium-238.

10. The TI power cell of claim 1, wherein the layer of radioactive material, the layer of electron emitting material, and the layer of electron collecting material are enclosed by an outer shell.

11. A method for generating an electric current, comprising:
heating a layer of electron emitting material disposed on a layer of radioactive material by radioactive decay of the layer of radioactive material;
emitting electrons from the layer of electron emitting material to a layer of electron collecting material by thermionic emission, wherein the layer of electron emitting material is physically separated from the layer of electron collecting material to define a chamber between the layer of electron collecting material and the layer of electron emitting material, wherein the chamber is substantially evacuated to permit electrons to traverse the chamber from the layer of electron emitting material to the layer of electron collecting material; and
inducing an electric current to flow through the layer of electron collecting material connected to an electrical load, wherein heat generated over time by the layer of radioactive material causes a substantially constant flow of electrons to be emitted by the layer of electron emitting material.

12. The method of claim 11, wherein emitting the electrons includes emitting electrons from an array of spikes disposed on the layer of electron emitting material to concentrate the electrons emitted by the layer of electron emitting material at tips of the spikes, wherein the tips of the spikes point toward the layer of electron collecting material.

13. The method of claim 12, wherein emitting the electrons includes emitting electrons from the tips of the spikes that are separated from one another by a lateral separation of approximately 100 micrometers to approximately 1 millimeter.

14. The method of claim 12, wherein emitting the electrons includes emitting electrons from the tips of the spikes to the layer of electron collecting material that are separated by a gap of approximately 100 micrometers to approximately 1 millimeter.

15. The method of claim 12, wherein emitting the electrons includes emitting electrons from the tips of the spikes that are exposed by a layer of spacer material disposed between the layer of electron emitting material and the layer of electron collecting material to the layer of electron collecting material.

16. The method of claim 11, wherein inducing the electric current includes inducing the electric current to flow from a first terminal coupled to the layer of electron emitting material to the electrical load and from the electrical load to a second terminal coupled to the layer of electron collecting material.

17. The method of claim 11, wherein a layer of insulating material is disposed between the layer of radioactive material and the layer of electron emitting material.

18. The method of claim 11, wherein:
the layer of electron emitting material encapsulates the layer of radioactive material; and
the layer of electron collecting material surrounds the layer of electron emitting material.

19. A thermionic (TI) power cell, comprising:
a heat source, wherein the heat source includes an exhaust manifold;
a heat conductive layer that provides heat from the heat source;
a layer of electron emitting material disposed on the heat conductive layer; and
a layer of electron collecting material, wherein the layer of electron emitting material is physically separated from the layer of electron collecting material to define a chamber between the layer of electron collecting material and the layer of electron emitting material, wherein the chamber is substantially evacuated to permit electrons to traverse the chamber from the layer of electron emitting material to the layer of electron collecting material, and further wherein heat generated over time by the heat source causes a substantially constant flow of electrons to be emitted by the layer of electron emitting material to induce an electric current to flow through the layer of electron collecting material when the layer of electron collecting material is connected to an electrical load.

* * * * *